United States Patent
Park et al.

(10) Patent No.: US 9,824,052 B2
(45) Date of Patent: Nov. 21, 2017

(54) BACKPLANE BUS STRUCTURE OF COMMUNICATION SYSTEM AND BOARD RECOGNITION METHOD USING SAME

(75) Inventors: Jong-Won Park, Daejeon (KR); Yong-Kon Lim, Daejeon (KR); So Young Sung, Seoul (KR)

(73) Assignee: KOREA INSTITUTE OF OCEAN SCIENCE AND TECHNOLOGY, Gyeonggi-do (KR)

( * ) Notice: Subject to any disclaimer, the term of this patent is extended or adjusted under 35 U.S.C. 154(b) by 275 days.

(21) Appl. No.: 14/404,281

(22) PCT Filed: Jun. 29, 2012

(86) PCT No.: PCT/KR2012/005157
§ 371 (c)(1),
(2), (4) Date: May 5, 2015

(87) PCT Pub. No.: WO2013/180334
PCT Pub. Date: Dec. 5, 2013

(65) Prior Publication Data
US 2015/0234769 A1    Aug. 20, 2015

(30) Foreign Application Priority Data
May 31, 2012 (KR) .................. 10-2012-0058349

(51) Int. Cl.
  H05K 7/10      (2006.01)
  G06F 13/40     (2006.01)
  G06F 13/364    (2006.01)
  G06F 13/42     (2006.01)

(52) U.S. Cl.
  CPC ........ *G06F 13/4081* (2013.01); *G06F 13/364* (2013.01); *G06F 13/4282* (2013.01)

(58) Field of Classification Search
  None
  See application file for complete search history.

(56) References Cited

U.S. PATENT DOCUMENTS

| | | | | |
|---|---|---|---|---|
| 6,693,901 B1 * | 2/2004 | Byers | ............. | H04L 49/405 370/362 |
| 7,453,870 B2 * | 11/2008 | Alappat | ............. | H04L 49/10 370/360 |
| 7,676,694 B2 * | 3/2010 | Sullivan | ............. | G06F 11/006 714/25 |

(Continued)

*Primary Examiner* — Elias Mamo
(74) *Attorney, Agent, or Firm* — Dentons US LLP

(57) ABSTRACT

The present invention relates to the prevention of bus conflicts in the backplane by providing a bus structure which is configured to control the activation of an attached slave board in the backplane to/from which a plurality of slave boards are attached and detached. The backplane according to the present invention can prevent data bus conflicts and improve the stability of a corresponding system by configuring general purpose I/O (GPIO) pins in a 2 bit request/grant scheme between a master board and the plurality of slave boards. Accordingly, the present invention can improve system reliability, maintainability, and competitiveness in various fields such as the fields of communication devices and server devices, remote monitors and control systems, vessel communications, aircraft communications, and wired and wireless communications in which various protocols are combined and implemented.

2 Claims, 9 Drawing Sheets

(56) References Cited

U.S. PATENT DOCUMENTS

| | | | |
|---|---|---|---|
| 7,738,757 B1* | 6/2010 | Pakravan | G02B 6/3897 370/351 |
| 8,966,210 B2* | 2/2015 | Myrah | H04L 43/0811 710/17 |
| 2003/0061428 A1* | 3/2003 | Garney | G06F 9/5027 710/300 |
| 2007/0075728 A1* | 4/2007 | Chang | G06F 1/26 324/764.01 |
| 2007/0094472 A1* | 4/2007 | Marks | G06F 3/0607 711/170 |
| 2009/0193165 A1 | 7/2009 | Hsieh et al. | |
| 2015/0067226 A1* | 3/2015 | Iskandar | G06F 13/4031 710/309 |

* cited by examiner

BACKPLANE BUS STRUCTURE OF COMMUNICATION SYSTEM AND BOARD RECOGNITION METHOD USING SAME

RELATED APPLICATION DATA

This application is the Section 371 National Stage of PCT/KR2012/005157 filed on Jun. 29, 2012, the entirety of which is incorporated herein by reference to the extent permitted by law. The application claims the benefit of priority to Korean Patent Application No. KR 10-2012-0058349, filed on May 31, 2012, the entirety of which is incorporated herein by reference to the extent permitted by law.

BACKGROUND OF THE INVENTION

The present invention relates generally to the backplane bus structure of a communication system and a board recognition method using the backplane bus structure and, more particularly, to the backplane bus structure of a communication system and a board recognition method using the backplane bus structure, which prevent a collision between buses from occurring even if a new slave board is mounted on a backplane, thus enabling a given system to be stably operated.

In particular, the present invention relates to a backplane bus structure of a communication system and a board recognition method using the backplane bus structure, in which a bus structure for controlling whether to activate a mounted slave board is configured on a backplane, thus preventing a collision between buses from occurring on the backplane even if a new slave board is mounted.

Generally, a server and a storage device, as well as communication equipment, are each provided with a backplane having a plurality of slots. When a slave board for performing a specific function is mounted in a slot, the backplane functions to provide a communication channel for data transmission between the mounted slave board and a master board.

Such a backplane may also perform a function of supplying operating power to the slave board mounted in the slot, as well as a data transmission function.

Meanwhile, respective slave boards mounted in a plurality of slots may perform data transmission to the master board using different communication protocols.

In this case, in order to perform data transmission between the master board and slave boards using different communication protocols, buses corresponding to the respective communication protocols are allocated to the backplane.

For example, Korean Patent Application Publication No. 10-2008-0001044 entitled "Universal backplane configuration apparatus and method" discloses technology for configuring a backplane so that various communication protocols can be used, thus enabling a single backplane to be universally used.

However, in the case of a system in which a plurality of slave boards are mounted and operated on a single backplane, if a new slave board is mounted on the backplane while the system is operating, a collision between buses configured on the backplane may occur.

Korean Patent Application Publication No. 10-2008-0001044 does not yet present a solution of the problem.

SUMMARY OF THE INVENTION

In order to solve the above problem, an object of the present invention is to provide the backplane bus structure of a communication system and a board recognition method using the backplane bus structure, in which a bus structure for controlling the activation of a mounted slave board is configured on a backplane on or from which a plurality of slave boards are mounted or removed, thus preventing a collision between buses on the backplane.

In particular, the object of the present invention is to provide the backplane bus structure of a communication system and a board recognition method using the backplane bus structure, in which a 2-bit request/grant-type General Purpose I/O pins (GPIO) bus is configured between a master board and slave boards, thus preventing a collision between data buses from occurring.

In order to accomplish the above object, a backplane bus structure of a communication system according to the present invention includes a master board configured to perform data communication based on a set communication protocol; a backplane configured to support at least one communication bus; at least one slave board detachably connected to the backplane and configured to perform data communication with the master board; and a General Purpose I/O pins (GPIO) bus configured on the backplane to connect the master board to the at least one slave board and used to make a request and an approval regarding whether to activate data communication between the master board and the at least one slave board.

In an embodiment, the GPIO bus is used so that the at least one slave board requests the master board to activate the at least one communication bus and the master board responds to the corresponding activation request.

Further, a board recognition method using a backplane bus structure of a communication system according to the present invention, the board recognition method being performed by the communication system including the backplane bus structure, includes a) determining whether a detachably configured board has been mounted on a backplane by checking whether a mounting check signal to be transmitted has been received through a GPIO bus; b) activating the board through the GPIO bus if it is determined that the board has been mounted; and c) performing data communication with the board mounted on the backplane, based on a set communication protocol if the board has been activated to turn on a data communication line.

In an embodiment, a) may include a-1) checking whether the mounting check signal has been received through the GPIO bus; a-2) identifying a slot through which the mounting check signal is received if the mounting check signal has been received; and a-3) determining that the board has been mounted in the slot.

Further, b) may include b-1) determining whether the board is operable; and b-2) activating the board through the GPIO bus if it is determined that the board is operable. For example, b-2) may include, if the mounting check signal has been received, transmitting a response signal (data communication approval signal) to the mounting check signal (data communication request signal) to the board, thus activating the board.

In addition, in a dual system, a backplane bus structure of a communication system according to the present invention includes at least two master boards configured to perform data communication based on a set communication protocol; a backplane configured to support at least one communication bus; at least one slave board detachably connected to the backplane and configured to perform data communication with each master board; and a General Purpose I/O pins (GPIO) bus configured on the backplane to connect a first one of the at least two master boards to the at least one slave board, the GPIO bus being used to make a request and an approval regarding whether to activate data communication between the first master board and the slave board.

In an embodiment, the backplane may further include a heart bit bus configured to connect the at least two master boards and used to allow the first one of the at least two master boards to determine whether a second master board performs data communication, and the GPIO bus may be used such that, if the first master board determines that the second master board does not perform data communication through the heart bit bus, the at least one slave board requests the first master board to activate the at least one communication bus, and the first master board responds to the activation request.

Further, a board recognition method using a backplane bus structure of a communication system according to the present invention in a dual system, the board recognition method being performed by a dual communication system including the backplane bus structure, includes a) determining, by a first one of at least two master boards, whether a slave board has been mounted on a backplane by checking whether a mounting check signal to be transmitted has been received through a General Purpose I/O pins (GPIO) bus; b) determining, by the first master board, whether a second one of the at least two master boards performs data communication if it is determined that the slave board has been mounted; c) activating, by the first master board, the slave board through the GPIO bus if it is determined that the second master board does not perform data communication; and d) performing, by the first master board, data communication with the slave board mounted on the backplane, based on a set communication protocol if the slave board has been activated to turn on a data communication line.

In an embodiment, a) may include a-1) checking whether the mounting check signal has been received through the GPIO bus; a-2) identifying a slot through which the corresponding mounting check signal has been received if the mounting check signal has been received; and a-3) determining that the slave board has been mounted in the slot.

Furthermore, b) may include b-1) transmitting, by the first master board, a heart bit to the second master board; b-2) receiving, by the first master board, a response signal to a result of transmission; b-3) checking the response signal, and determining whether the second master board performs data communication; and b-4) determining that the slave board can be activated if the second master board does not perform data communication.

Furthermore, c) may include c-1) determining whether the slave board is operable; and c-2) activating the slave board through the GPIO bus if it is determined that the slave board is operable.

In accordance with the technical solutions, the present invention is advantageous in that a "digital input/output" structure based on a separate GPIO bus is configured between a master board and slave boards, thus easily determining the locations of slots, in which slave boards are mounted, on the backplane.

Therefore, the present invention is advantageous in that, in a system to which the backplane bus structure is applied, functions of real-time control and "hot swap" that use various communication schemes may be very easily performed.

In particular, the present invention is advantageous in that a bus structure for transmitting GPIO signals is configured separately from data buses between a master board and slave boards, thus providing task efficiency even upon designing backplanes and manufacturing backplane boards (printed circuit boards: PCBs).

Furthermore, a physical transmission scheme for data communication implemented on the backplane is implemented using a "differential line drive/receiver" scheme or a "Low Voltage Differential Signal (LVDS)" scheme, thus more robustly performing data communication between a master board and slave boards.

DESCRIPTION OF PRESENTLY PREFERRED EMBODIMENTS

Embodiments of a backplane bus structure of a communication system and a board recognition method using the backplane bus structure according to the present invention may be applied in various manners. Hereinafter, preferred embodiments of the invention will be described in detail with reference to the attached drawings.

Figure 1:
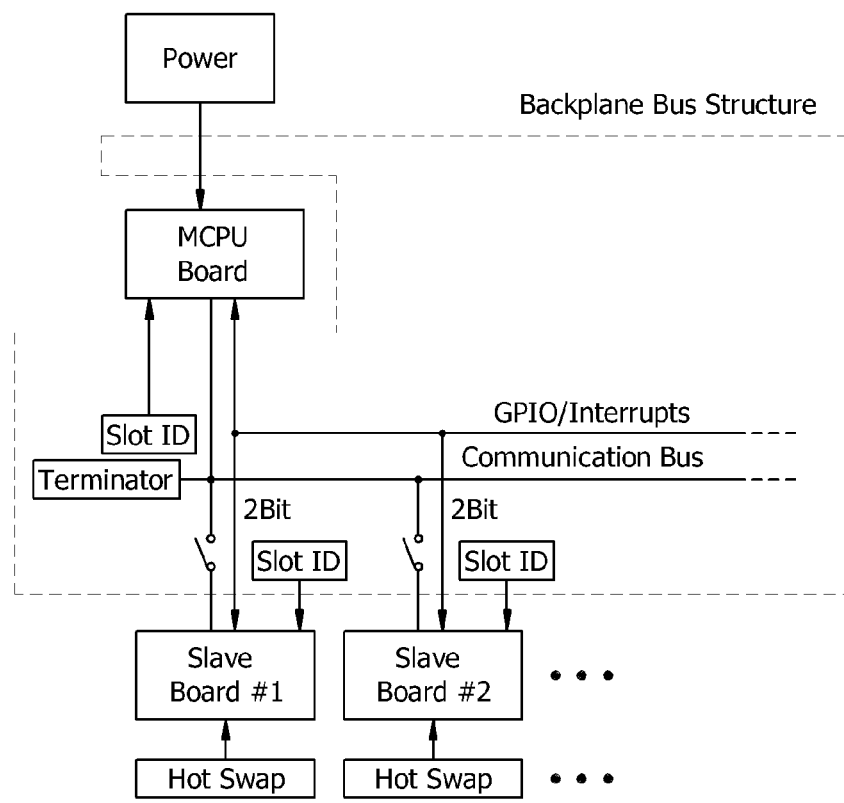
FIG. 1 is a block diagram showing an embodiment of a backplane bus structure of a communication system according to the present invention.

FIG. 1 is a block diagram showing an embodiment of a backplane bus structure of a communication system according to the present invention.

Referring to FIG. 1, the backplane bus structure of a communication system includes a "Master Central Processing Unit: MCPU Board" that is a master board, a backplane, slave boards, and a General Purpose I/O pins (GPIO) bus.

The master board performs data communication (hereinafter also referred to as "data transmission") with the slave boards via the backplane based on set communication protocols. In an embodiment, the master board may provide slot identifiers (slot IDs) to perform data communication with the slave boards. It is apparent that, since the configuration of the master board and the type and number of communication protocols processed by the master board may be modified in various forms depending on the requirements of those skilled in the art, they are not limited to specific examples.

The backplane enables the master board and a plurality of slave boards to smoothly perform data communication by supporting at least one communication bus. In an embodiment, terminators are configured at both ends of the communication bus, so that, when traffic increases, redundant signals are absorbed to stably maintain a data transfer speed on the backplane.

The slave boards are detachably connected to the backplane to perform data communication with the master board. In an embodiment, each slave board may be provided with a "slot ID" to perform data communication with the master board. Further, each slave board may be configured to support a "hot swap" function. Here, "hot swap" denotes a function of repairing or replacing specific parts even in a state in which the system is supplied with and operated by power.

The GPIO bus is configured on the backplane to connect the master board to at least one slave board and is used to make a request and an approval regarding whether to activate data communication between the master board and the at least one slave board.

In an embodiment, the GPIO bus may be used so that at least one slave board requests the master board to activate at least one communication bus (bus corresponding to a communication protocol used in the corresponding slave board), and the master board responds to the activation request.

A method of recognizing a slave board using such a GPIO bus will be described in detail later.

Further, a physical transmission scheme for data communication based on the communication bus configured on the backplane may be implemented to more robustly perform data communication using a "differential line drive/receiver" scheme or a "Low Voltage Differential Signal (LVDS)" scheme.

Figure 2:
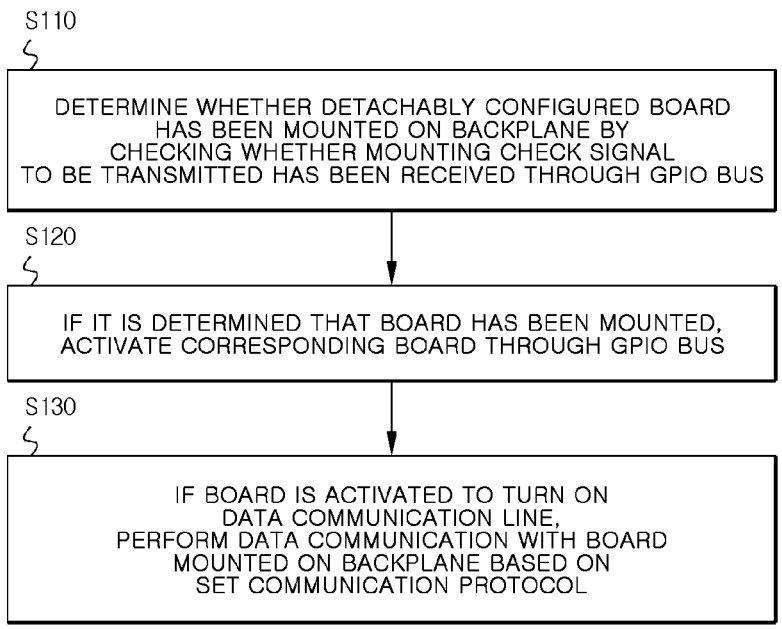
FIG. 2 is a flowchart showing an embodiment of a board recognition method using the backplane bus structure of FIG. 1.
Figure 3:
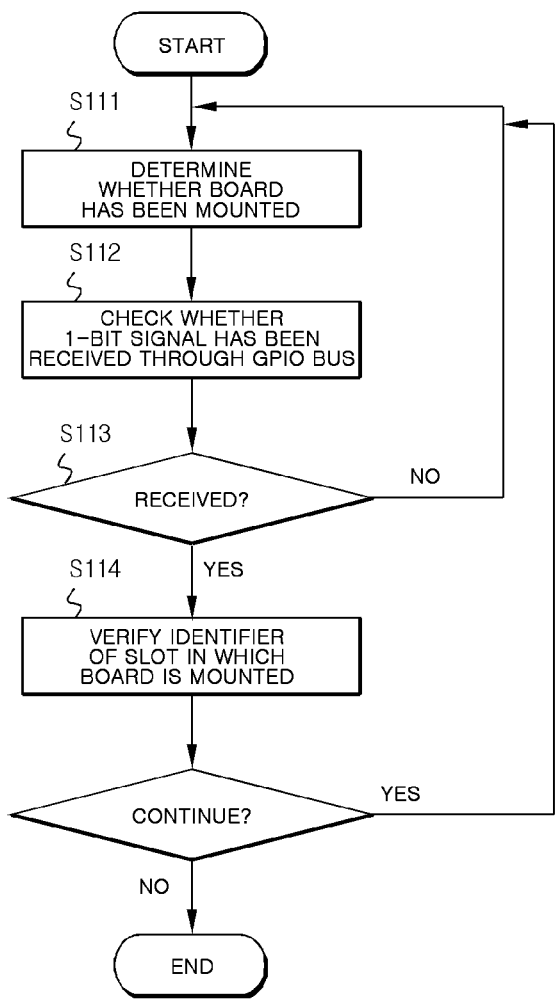
FIG. 3 is a flowchart showing a detailed embodiment of step S110 of FIG. 2.
Figure 4:
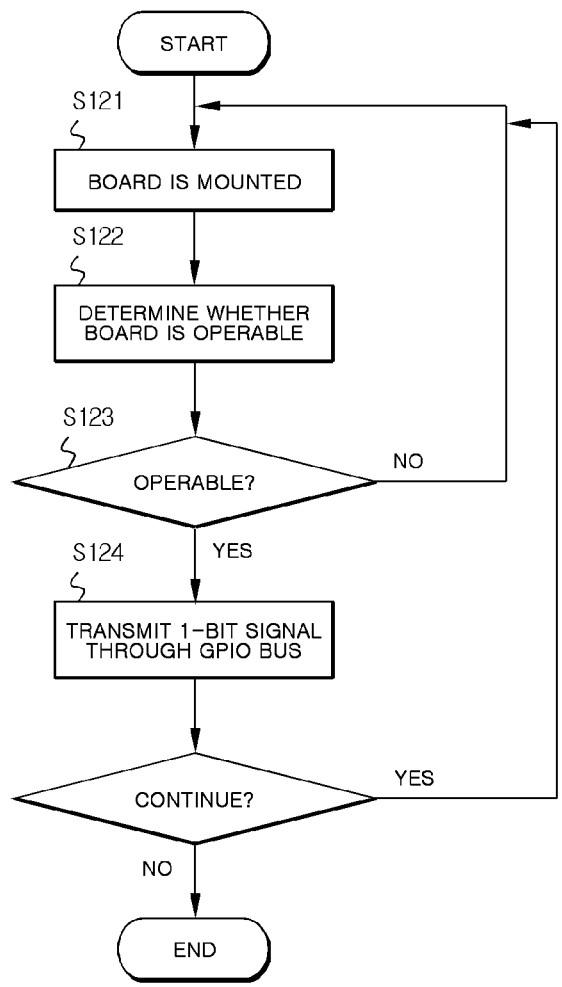
FIG. 4 is a flowchart showing a detailed embodiment of step S120 of FIG. 2.

FIG. 2 is a flowchart showing an embodiment of a board recognition method using the backplane bus structure of FIG. 1, FIG. 3 is a flowchart showing a detailed embodiment of step S110 of FIG. 2, and FIG. 4 is a flowchart showing a detailed embodiment of step S120 of FIG. 2.

Referring to FIG. 2, the master board determines whether a detachably configured board has been mounted on the backplane by checking whether a mounting check signal to be transmitted has been received through a GPIO bus (step S110).

More specifically, as shown in FIG. 3, the master board may check whether a mounting check signal has been received through the GPIO bus (step S112), in order to continuously determine whether a slave board has been mounted in a state in which the system is operated (step S111). In an embodiment, the mounting check signal may include a data communication request signal. For example, the data communication request signal may include a 1-bit signal input through the GPIO bus.

If the mounting check signal has been received through the GPIO bus (step S113), the master board may identify a slot through which the corresponding mounting check signal is received (step S114). In an embodiment, the identification of the slot in which the slave board is mounted may be performed by verifying the slot identifier (ID) of the slot. For example, the slot ID may be transmitted together with the mounting check signal to the master board through the GPIO bus.

If the mounting check signal is received from the specific slot, the master board may determine that the corresponding board (slave board) has been mounted in the slot.

If it is determined that the corresponding board has been mounted, the master board activates the board through the GPIO bus (step S120).

This procedure is described in detail below. As shown in FIG. 4, if it is determined that the corresponding board has been mounted in the slot (step S121), the master board may determine whether the board is operable (step S122). For example, the determination of whether the corresponding board is operable may be performed by checking whether the system uses a supportable communication protocol, whether the board has been normally connected, or whether power has been supplied to the corresponding board (in the case of a repair of the board, power is cut off).

If it is determined that the corresponding board is normally operable (step S123), the master board may activate the board through the GPIO bus (step S124). For example, the activation of the board may be performed by the master board transmitting a 1-bit signal to the board through the GPIO bus.

In an embodiment, when the mounting check signal is received, the master board may activate the corresponding board by transmitting a response signal (data communication approval signal) to the received mounting check signal (data communication request signal) to the board.

Once the board is activated by the master board, the board may turn on a data communication line. When the data communication line is turned on in this way, the master board performs data communication with the board mounted on the backplane, based on a set communication protocol (step S130).

Below, in the description of another embodiment of a backplane bus structure of a communication system according to the present invention, a dual system in which two master boards are configured will be described as an example. Of course, it is apparent that the present invention is not limited to the dual system corresponding to another embodiment, which will be described below, and the present invention may be applied to a parallel processing system or the like including at least two master boards at the request of those skilled in the art.

Figure 5:
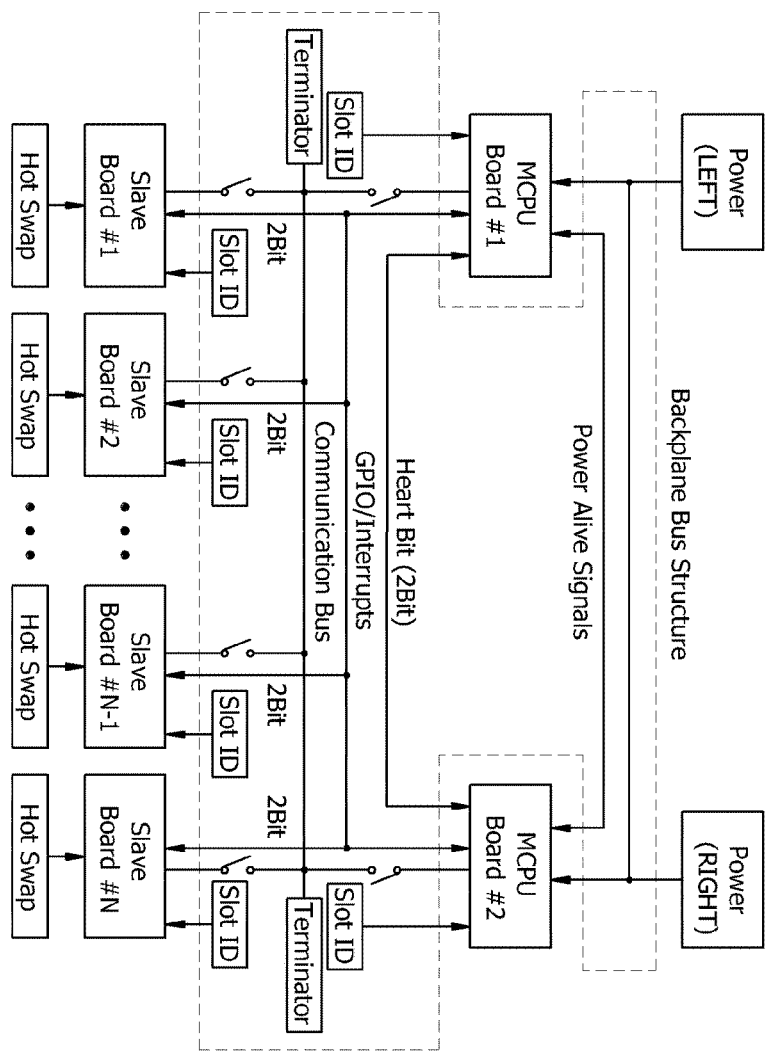
FIG. 5 is a block diagram showing another embodiment of a backplane bus structure of a communication system according to the present invention.

FIG. 5 is a block diagram showing another embodiment of a backplane bus structure of a communication system according to the present invention.

Referring to FIG. 5, the backplane bus structure of a communication system includes at least two master boards configured to perform data communication based on set communication protocols; a backplane configured to support at least one communication bus; at least one slave board detachably connected to the backplane to perform data communication with each master board; and a General Purpose I/O pins (GPIO) bus configured on the backplane to connect a first one of the at least two master boards to the at least one slave board, and used to make a request and an approval regarding whether to activate data communication between the corresponding master board and the slave board.

In an embodiment, the backplane further includes a heart bit bus that is configured to connect the at least two master boards, thus allowing the first one of the at least two master boards to determine whether a second master board performs data communication.

Further, the backplane may be configured to perform a switching operation depending on whether the corresponding master board performs data communication, which can be determined through the heart bit bus, upon configuring communication buses that connect each master board to slave boards.

The GPIO bus may be used such that, if a first master board determines, through the heart bit bus, that a second master board does not perform data communication, the at least one slave board requests the first master board to activate at least one communication bus, and the first master board responds to the activation request.

Figure 6:
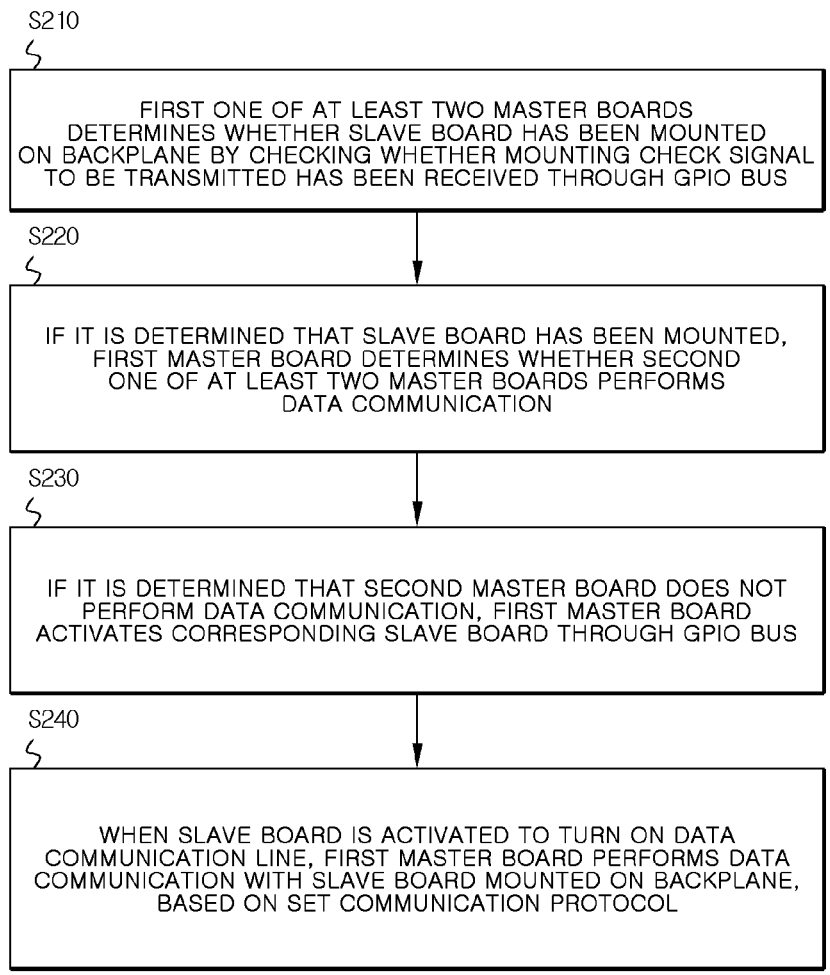
FIG. 6 is a flowchart showing an embodiment of a board recognition method using the backplane bus structure of FIG. 5.
Figure 7:
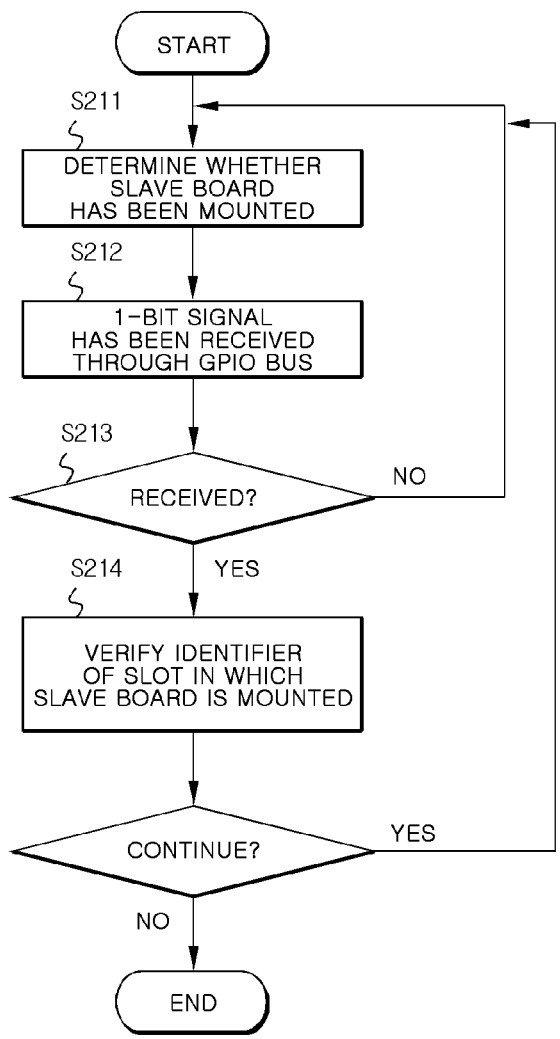
FIG. 7 is a flowchart showing a detailed embodiment of step S210 of FIG. 6.
Figure 8:
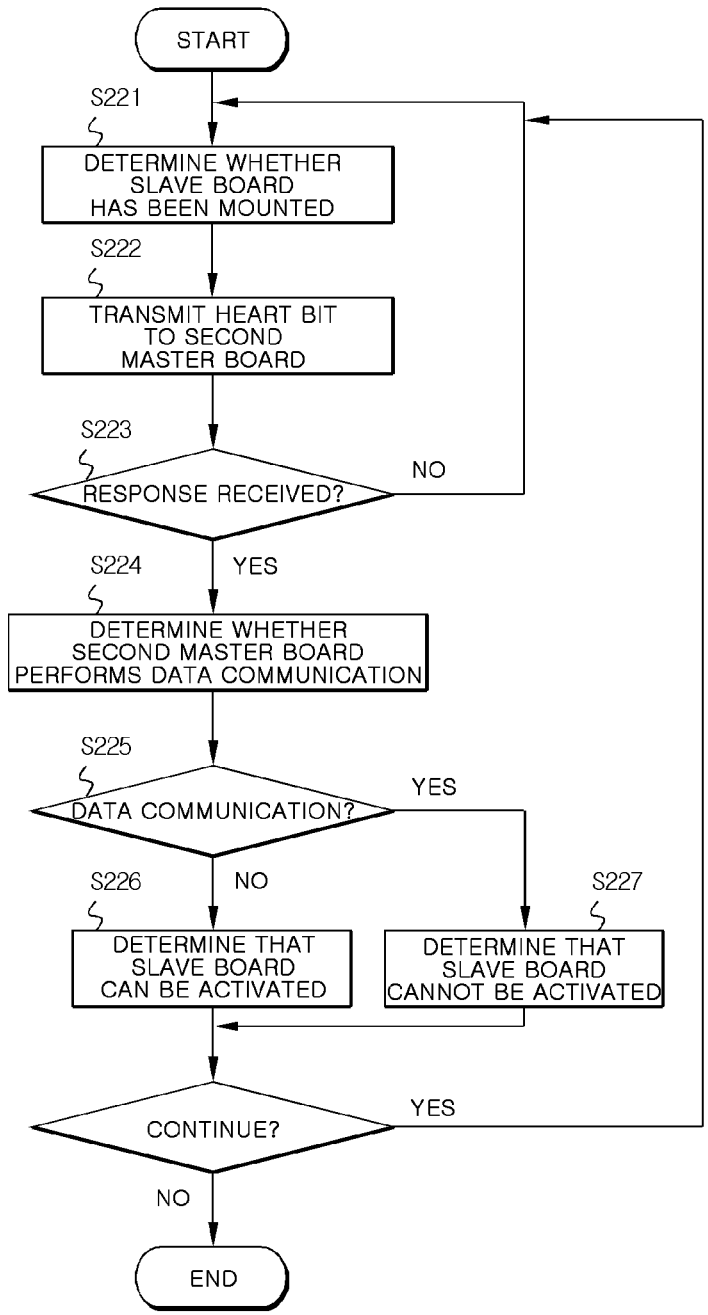
FIG. 8 is a flowchart showing a detailed embodiment of step S220 of FIG. 6.
Figure 9:
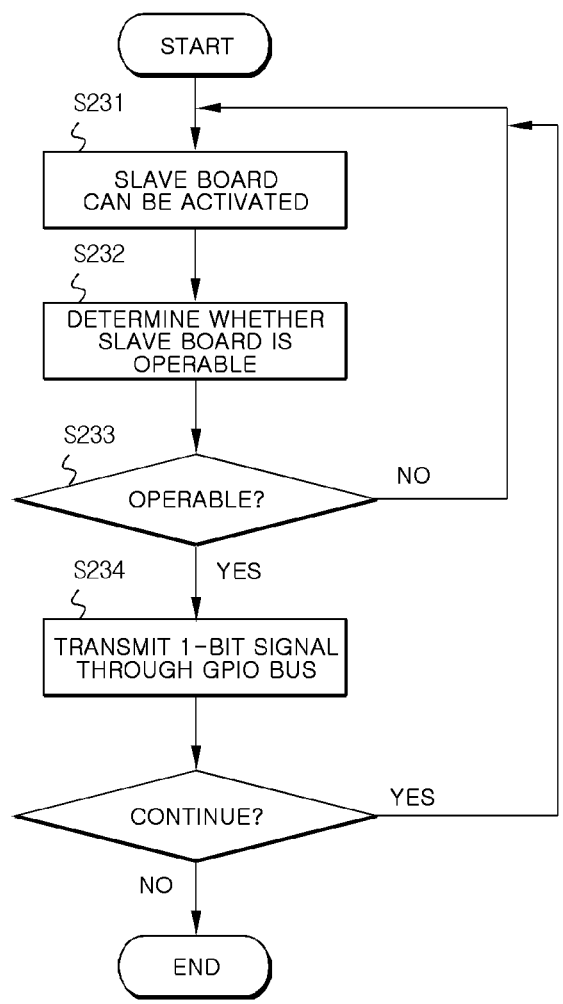
FIG. 9 is a flowchart showing a detailed embodiment of step S230 of FIG. 6.

FIG. 6 is a flowchart showing an embodiment of a board recognition method using the backplane bus structure of FIG. 5, FIG. 7 is a flowchart showing a detailed embodiment of step S210 of FIG. 6, FIG. 8 is a flowchart showing a detailed embodiment of step S220 of FIG. 6, and FIG. 9 is a flowchart showing a detailed embodiment of step S230 of FIG. 6.

Referring to FIG. 6, a first one of at least two master boards determines whether a slave board has been mounted on the backplane by checking whether a mounting check signal to be transmitted has been received through a GPIO bus (step S210).

This is described in detail below. As shown in FIG. 7, in order to continuously determine whether a slave board has been mounted during the operation of the system (step S211), the first master board may check whether a mounting check signal has been received through the GPIO bus (step S212). For example, a data communication request signal may include a 1-bit signal input through the GPIO bus.

If the mounting check signal has been received through the GPIO bus (step S213), the first master board may identify a slot through which the corresponding mounting check signal is received (step S214). In an embodiment, the identification of the slot in which the slave board is mounted may be performed by verifying the slot ID of the slot. For example, the slot ID may be transmitted together with the mounting check signal to the first master board through the GPIO bus.

When the mounting check signal is received from a specific slot, the first master board may determine that the slave board has been mounted in the slot.

As a result of the determination, if the slave board has been mounted, the first master board determines whether a second one of the at least two master boards performs data communication (step S220).

This procedure is described below. As shown in FIG. 8, if the first master board has determined the mounting of the slave board (step S221), it may transmit a heart bit to the second master board (step S222) and may receive a response signal to the result of the transmission from the second master board (step S223).

The first master board may determine whether the second master board performs data communication by checking the response signal received from the second master board (step S224).

In this case, if it is determined that the second master board does not perform data communication (step S225), the first master board may determine that the corresponding slave board can be activated (step S226).

If the second master board performs data communication (step S225), the first master board may determine that the corresponding slave board cannot be activated (step S227).

Therefore, at steps S225 to S227 of FIG. 8, the first board may activate the corresponding slave board while preventing a collision caused by the use of the communication bus.

If it is determined that the second master board does not perform data communication, the first master board activates the corresponding slave board through the GPIO bus (step S230).

This procedure is described in detail. As shown in FIG. 9, if it is determined that the slave board can be activated (step S231), the first master board may determine whether the slave board is operable (step S232).

If it is determined that the slave board is normally operable (step S233), the first master board may activate the corresponding slave board through the GPIO bus (step S234). For example, the activation of the slave board may be performed by the first master board transmitting a 1-bit signal to the slave board through the GPIO bus.

When the slave board is activated by the first master board, the slave board may turn on a data communication line. Once the data communication line is turned on in this way, the first master board performs data communication with the slave board mounted on the backplane, based on a set communication protocol (step S240).

As described above, the backplane bus structure of the communication system and the board recognition method using the backplane bus structure according to the present invention have been described. Those skilled in the art to which the present invention pertains will understand that the technical configuration of the present invention may be practiced in other detailed forms without departing from the technical spirit or essential features of the invention.

Therefore, the above-described embodiments of the present invention should be understood to be exemplary in all aspects, rather than restrictive. The scope of the present invention is defined by the accompanying claims rather than the above detailed descriptions, and then all changes or modifications derived from the meanings and scope of the claims and equivalents thereof should be interpreted as being included in the scope of the present invention.

The present invention may improve the reliability, maintainability and product competitiveness of systems in various fields, such as communication equipment and server equipment, remote monitoring and control systems, vessel communication, aeronautical communication, and wired/wireless communication for integrating and operating various communication protocols.

The invention claimed is:

1. A board recognition method using a backplane bus structure of a communication system comprising (a) first and second master boards configured to perform data communication based on a set communication protocol; (b) a backplane configured to support at least one communication bus; (c) a slave board detachably connected to the backplane and configured to perform data communication with each master board; and (d) a General Purpose I/O pins (GPIO) bus configured on the backplane to connect the first master board to the at least one slave board, the General Purpose I/O pins (GPIO) bus being to enable communication of a request and an approval regarding whether to activate data communication between the first master board or the second master board and the slave board, the method comprising:

a) determining, by the first master board, whether the slave board has been mounted on the backplane by checking whether a mounting check signal has been received by the first master board via the General Purpose I/O pins (GPIO) bus;

b) determining, by the first master board, whether the first master board or the second master board performs data communication if it is determined that the slave board has been mounted;

c) activating, by the first master board, the slave board through the General Purpose I/O pins (GPIO) bus to turn on a data communication line if it is determined that the second master board does not perform data communication; and d) performing, by the first master board, data communication via the data communication line with the slave board mounted on the backplane, based on the set communication protocol if the slave board has been activated to turn on the data communication line, wherein, the step of determining whether the second master board performs data communication further comprises the steps of:
i) transmitting, by the first master board, a heart bit to the second master board;
ii) receiving, by the first master board, a response signal in response to the transmission of the heart bit;
iii) checking the response signal by the first master board, and determining whether the second master board performs data communication; and
iv) determining by the first master board that the slave board can be activated if the second master board does not perform data communication.

2. The board recognition method of claim 1, wherein the step of determining whether the slave board has been mounted on the backplane further comprises the steps of:
i) checking, by the first master board, whether the mounting check signal has been received through the GPIO bus by the first master board;
ii) identifying, by the first master board, a slot through which the corresponding mounting check signal has been received if the mounting check signal has been received; and
iii) determining, by the first master board, that the slave board has been mounted in the slot.

* * * * *